(No Model.) 5 Sheets—Sheet 1.
M. J. TODD.
HORSE HAY RAKE.
No. 498,921. Patented June 6, 1893.
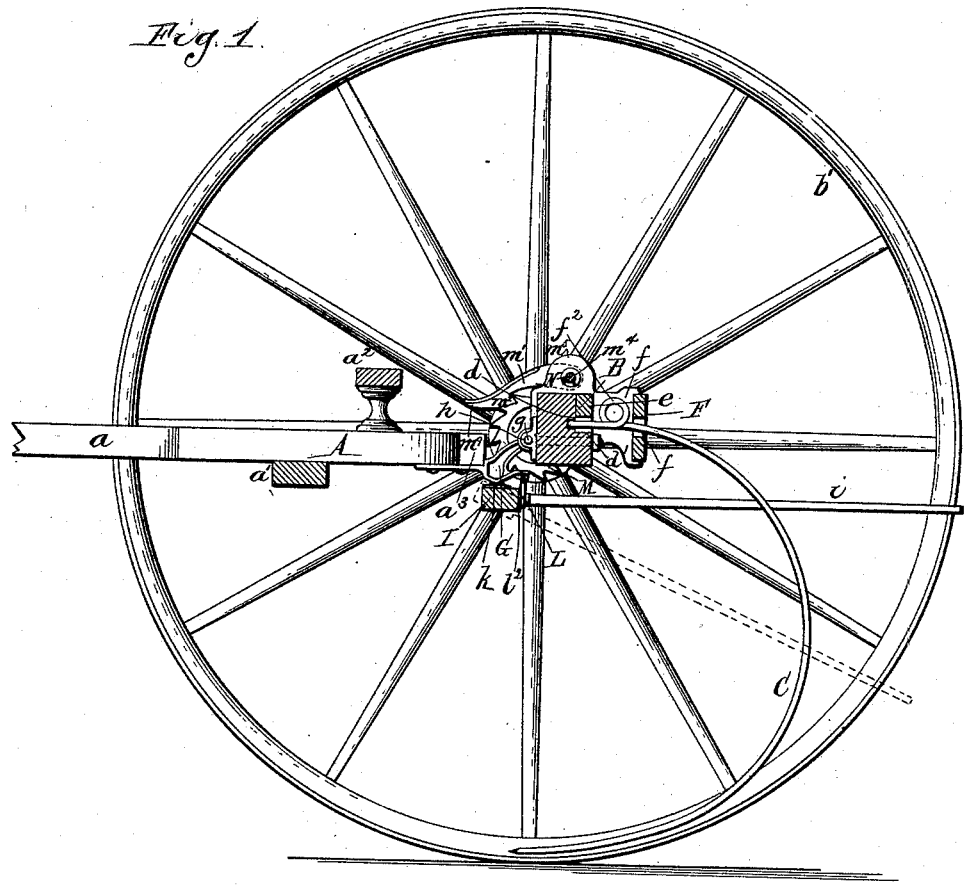
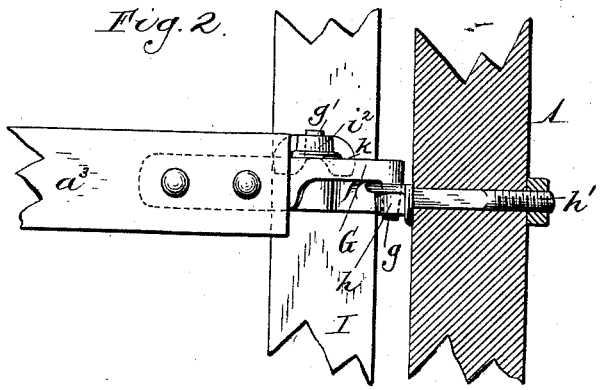
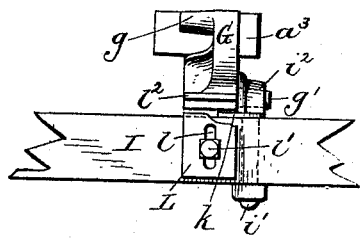

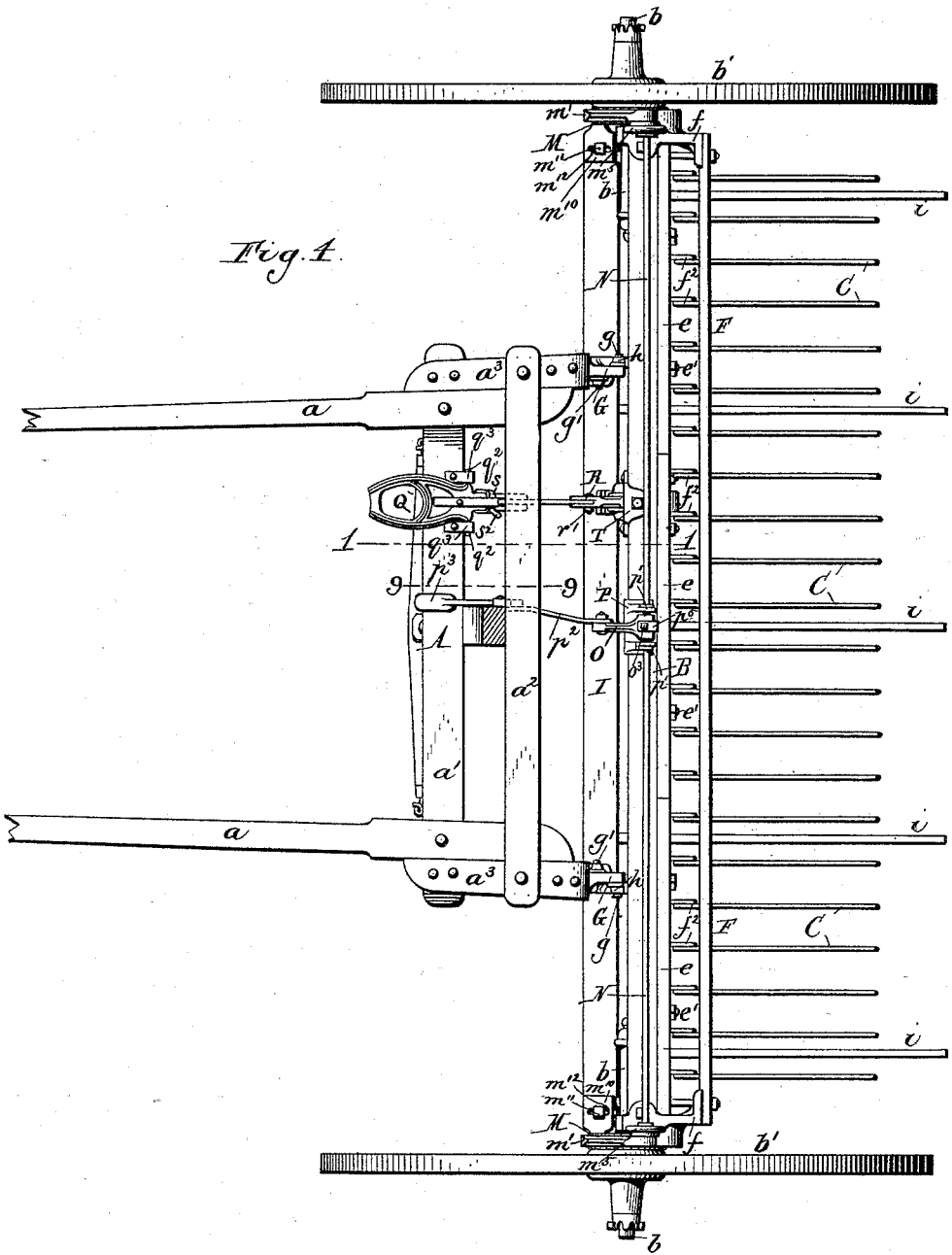

(No Model.) 5 Sheets—Sheet 3.
M. J. TODD.
HORSE HAY RAKE.
No. 498,921. Patented June 6, 1893.
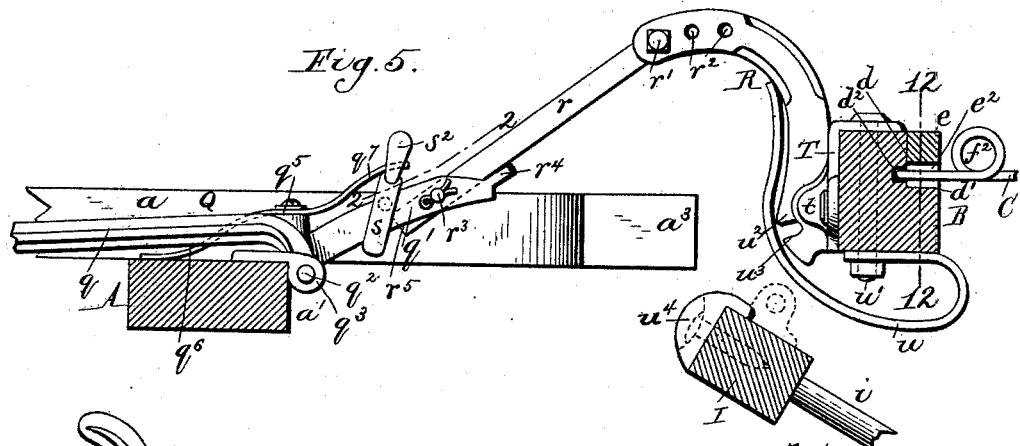
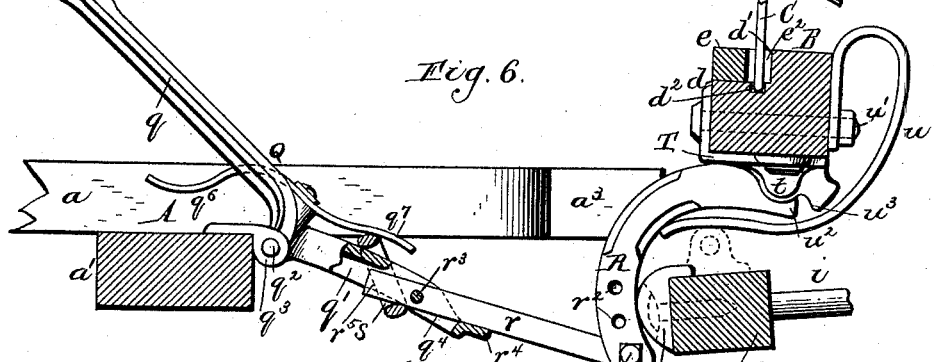
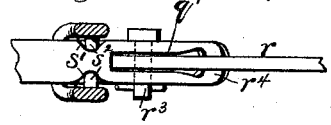
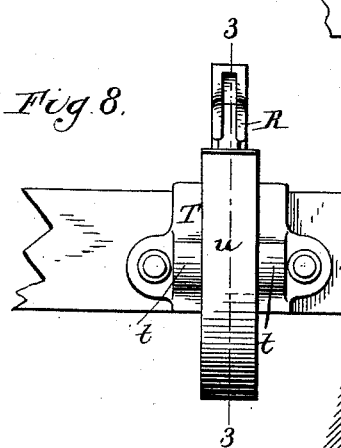
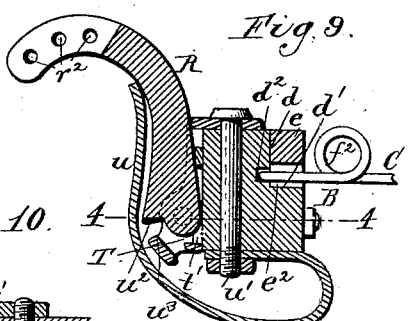
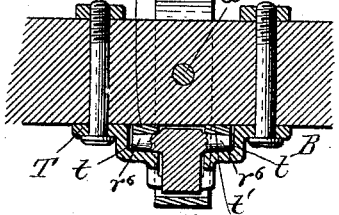
Witnesses:
Emil Neuhart
Theo. L. Popp
M. J. Todd,
Inventor.
By Wilhelm & Bonner
Attorneys.
THE NORRIS PETERS CO., PHOTO-LITHO., WASHINGTON, D. C.

(No Model.) 5 Sheets—Sheet 4.
M. J. TODD.
HORSE HAY RAKE.
No. 498,921. Patented June 6, 1893.
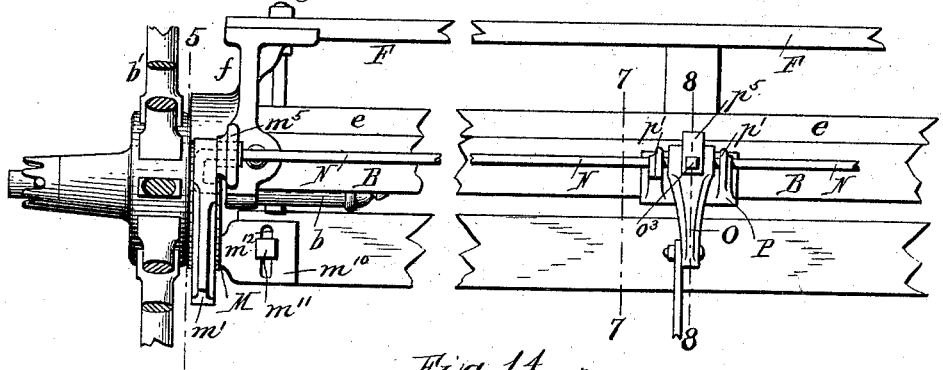
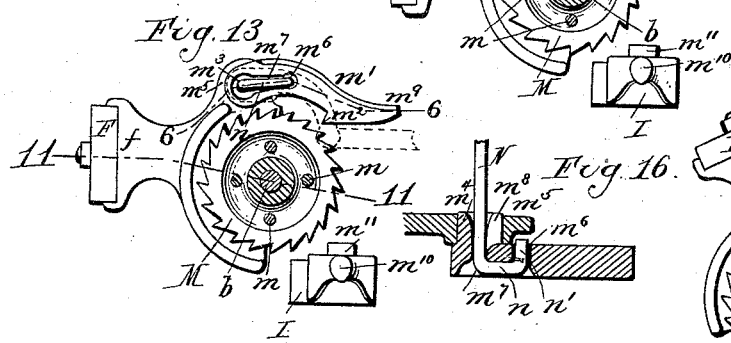
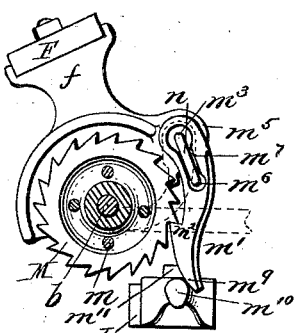
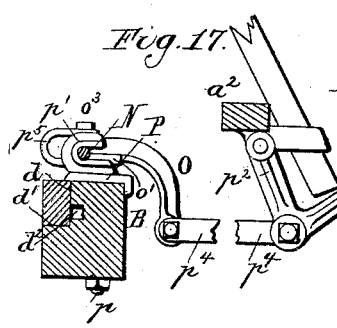
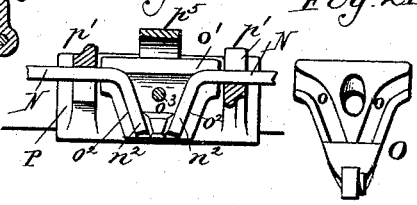
Witnesses:
Emil Neuhart
Theo. L. Popp
M. J. Todd, Inventor.
By Wilhelm & Bonner,
Attorneys.

(No Model.) 5 Sheets—Sheet 5.
M. J. TODD.
HORSE HAY RAKE.

No. 498,921. Patented June 6, 1893.

UNITED STATES PATENT OFFICE.

MARQUIS J. TODD, OF CORNING, ASSIGNOR TO THE PITTS AGRICULTURAL WORKS, OF BUFFALO, NEW YORK.

HORSE HAY-RAKE.

SPECIFICATION forming part of Letters Patent No. 498,921, dated June 6, 1893.

Application filed August 29, 1892. Serial No. 444,394. (No model.)

*To all whom it may concern:*

Be it known that I, MARQUIS J. TODD, a citizen of the United States, residing at Corning, in the county of Steuben and State of New York, have invented a new and useful Improvement in Horse Hay-Rakes, of which the following is a specification.

This invention relates to horse hay rakes and has for its object to improve the construction of the dumping mechanism whereby the teeth are elevated for dumping the hay. Also to improve the machine in several details.

Figure 22:
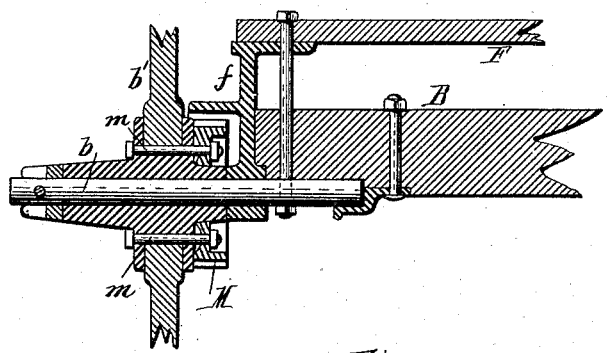
Figure 23:
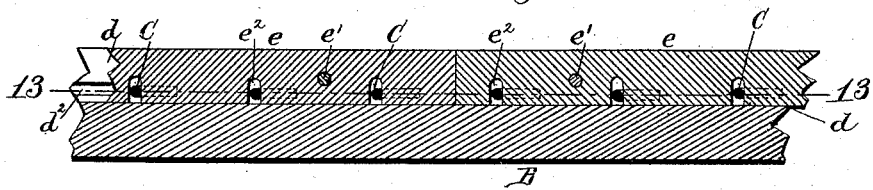
Figure 24:
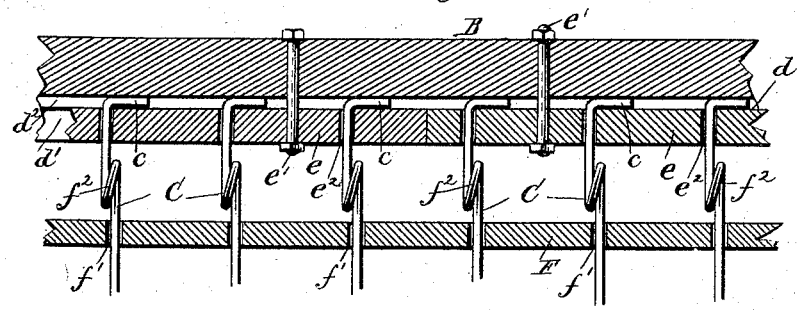

In the accompanying drawings consisting of five sheets:—Figure 1 is a longitudinal sectional elevation of a horse hay rake provided with my improvements. Fig. 2 is a fragmentary plan view of one of the hinge brackets connecting the draft frame, clearer head and rake head, the latter being shown in section. Fig. 3 is a rear elevation of the hinge bracket, clearer head and draft frame. Fig. 4 is a top plan view, on a reduced scale of the machine with the seat support shown in section. Fig. 5 is a fragmentary longitudinal section, on an enlarged scale in line 1—1, Fig. 4, showing the position of the retaining mechanism when the rake teeth are lowered. Fig. 6 is a similar view showing the position of the parts when the rake teeth are elevated. Fig. 7 is a horizontal section on line 2—2, Fig. 5. Fig. 8 is a front elevation of the cushion spring, rake arm and connecting parts. Fig. 9 is a vertical transverse section of the rake head, rake arm and cushion spring in line 3—3, Fig. 8. Fig. 10 is a vertical section in line 4—4, Fig. 9. Fig. 11 is a fragmentary top plan view of the ratchet mechanism and connecting parts. Fig. 12 is a top plan view of the rock arm for operating the ratchet mechanism and connecting parts. Fig. 13 is a vertical section in line 5—5, Fig. 11 showing the pawl disengaged from the ratchet wheel. Fig. 14 is a similar view showing the pawl in engagement with the ratchet wheel preparatory to raising the rake teeth. Fig. 15 is a similar view showing the pawl engaging with the stop whereby the teeth are released after being elevated. Fig. 16 is a horizontal section in line 6—6, Fig. 13. Figs. 17 and 18 are transverse sections of the rake head in lines 7—7, and 8—8, Fig. 12 respectively. Fig. 19 is a fragmentary sectional elevation on an enlarged scale of the trip lever and connecting parts in line 9—9, Fig. 4. Fig. 20 is a horizontal section in line 10—10 Fig. 18. Fig. 21 is a bottom view of the curved trip arm which operates the pawls. Fig. 22 is a fragmentary horizontal section in line 11—11 Fig. 13. Fig. 23 is a vertical section in line 12—12, Fig. 5. Fig. 24 is a horizontal section in line 13—13, Fig. 23.

Like letters of reference refer to like parts in the several figures.

A represents the draft frame which consists essentially of two thills $a$, front and rear cross bars $a'$ $a^2$ and rear end pieces $a^3$ arranged on the outer sides of the thills and secured to the cross bars.

B represents the rake head arranged transversely in rear of the draft frame and provided at its ends with axle arms $b$ upon which the driving wheels $b'$ are journaled.

C represents the rake teeth which are pivotally attached at their upper ends to the rake head. The upper rear corner of the rake head is cut away lengthwise to form a recess having a front vertical side $d$ and a lower horizontal side $d'$, as shown in Figs. 1, 5, 6, 9, 23 and 24. The front side $d$ of the recess is provided with a longitudinal groove $d^2$ which receives the wrists $c$ formed on the upper ends of the rake teeth at right angles to the latter. These wrists are confined in the groove $d^2$ by a cleat $e$ arranged in the recess of the rake head and fastened to the latter by horizontal bolts $e'$. The cleat is provided on its under side with vertical slots $e^2$ through which the rake teeth pass, as represented in Figs. 23 and 24. The cleat is preferably made in sections, as shown in Figs. 4, 22 and 23, so that when a rake tooth is broken it will only be necessary to remove a section of the cleat in order to replace a new tooth for the broken tooth. By this means of fastening the rake teeth to the rake head, only a small portion of the rake head is cut away, which avoids weakening of the latter and also permits a broken tooth to be replaced by a new one with greater convenience.

F represents the rider bar secured with its ends to the ends of the rake head by brackets $f$ and provided with a series of upright slots $f'$ in which the rake teeth play. Each of the teeth is provided between the rake head and rider bar with a coil $f^2$. The slots $f'$ in the rider bar permit of a limited vertical movement of the teeth and the coils $f^2$ permit the teeth to yield when unusual strains are applied to the teeth by striking stones or other obstructions. When the teeth drop and strike the lower ends of the rider bar after discharging the hay, the coils $f^2$ serve to cushion the fall of the teeth and prevent breaking the latter. By arranging the coils of the rake teeth between the rake head and rider bar, the coils are relieved from undue strain while the teeth are raking hay. The coils also cushion the teeth at the limit of their movement in the rider bar, whereby the teeth are less liable to be broken.

G represents rearwardly projecting hinge brackets secured to each end of the pieces $a^3$ of the draft frame, whereby the draft frame is connected with the rake head. Each of these brackets is provided at its rear end with an outwardly projecting pin $g$ and in front of the latter with an inwardly projecting pin $g'$. The rear pins $g$ engage with eyes $h$ formed on the front end of the bolts $h'$ secured to the rake head thereby pivotally connecting the draft frame with the rake head.

I represents the oscillating clearer head arranged transversely below the hinge bracket G and provided with clearer sticks $i$ which project rearwardly between the rake teeth. $i'$ represents bolts secured to the clearer head and provided at their upper ends with eyes $i^2$ which engage with the inwardly projecting pins $g'$ of the brackets G, thereby pivotally connecting the clearer head with the draft frame. The eyes of the rake head hold the end pieces of the draft frame against outward movement while the eyes of the clearer head hold the end pieces against inward movement thereby firmly securing the draft frame, clearer head and rake head together and preventing one from moving lengthwise upon the other. Before the rake teeth have gathered any hay the clearer sticks hang in their lowermost position, as represented by dotted lines in Fig. 1. When the hay accumulates upon the teeth, it bears against the clearer sticks and gradually raises the same, thereby preventing the hay from rolling and twisting. When the rake teeth have been dumped, the clearer sticks drop again to their normal position. In order to prevent the clearer head from striking against the under side of the hinge brackets, by the downward movement of the clearer sticks, the eyes $i^2$ of the clearer head bolts $i'$ are provided with wearing plates $k$ which project outwardly underneath the hinge brackets and strike against the under side of the latter upon oscillating the clearer head.

L represents adjusting plates whereby the upward movement of the clearer stick is regulated. Each of these plates is provided with a vertical slot $l$ and is adjustably secured to the rear side of the clearer head by a bolt $l'$, passing through the slot in the adjusting plate. Upon raising the clearer sticks, the adjusting plate strikes a rearwardly projecting stop $l^2$ formed on the under side of the bracket G thereby limiting the upward movement of the clearer sticks. This upward movement of the latter can be regulated by adjusting the plates L vertically upon the clearer bar.

M represents ratchet wheels secured to the inner side of the driving wheels by bolts $m$.

$m'$ represents pawls whereby the ratchet wheels and rake head are locked together for the purpose of dumping the hay. Each of these pawls is provided on its front end with a hook $m^2$ which engages with the teeth of one of the ratchet wheels, while its opposite end is provided with an eye $m^3$ having an inwardly projecting collar $m^4$. This collar is journaled in a bearing $m^5$ formed on the upper side of one of the brackets which secures the end of the rake head and rider bar together. Each of the pawls is provided with a transverse opening $m^6$ between its hook and eye and a groove $m^7$ extending radially in its outer side from the eye to the opening $m^6$.

N represents rock shafts whereby the pawls are thrown into engagement with the ratchet wheels. These rock shafts are arranged axially in line with each other and lengthwise over the rake head. The outer end of each rock shaft passes through the collar and eye of one of the pawls and is bent laterally at right angles to the main portion to form an arm $n$ which rests in the groove $m^7$ of the pawl and the outer end of the arm $n$ is bent inwardly parallel with the rock shaft forming a pin $n'$ which engages with the opening $m^6$ in the pawl thereby securing the latter and its rock shaft together. The inner end of each rock shaft is bent laterally, forming an arm $n^2$. For the purpose of connecting the pawl with its rock shaft the inner end of the latter is passed through the eye and collar of the pawl from the outer side until the arm of the rock shaft rests in the groove of the pawl and the pin of the arm engages with the front opening of the pawl. In order to permit the inner arm of the rock shaft to pass through the pawl the collar of the latter is provided in one side with a notch $m^8$ so that by first passing the inner arm of the rock shaft through the eye and collar of the pawl and then turning this arm into the notch of the collar, the rock shaft can be passed lengthwise through the pawl. By forming collars on the pawls and journaling the latter in bearings upon the rake head, the strain occasioned by the lifting of the rake head and teeth is placed entirely upon the pawls, thereby relieving the rock shafts from strain. The rock shafts perform only the function of throwing the pawls into engagement with the ratchet wheels and can therefore be made sufficiently light so that either of the rock shafts can spring or turn partially to permit one pawl to operate independently of the other, thereby enabling the hay to be dumped while turning.

O represents a depending trip arm whereby the rock shafts are operated. The upper end of this trip arm is arranged centrally over the rake head and its lower end is curved downwardly in front of the rake head. The upper end of the trip arm O is provided in its under side with two sockets $o$ which receive the inner arms of the rock shafts.

$o'$ is a clamping plate provided with two sockets $o^2$ corresponding to the sockets $o$ of the trip arm O and fitting over the inner arms of the rock shafts. The trip arm and clamping plate are firmly secured to the inner arms of the rock shafts by a clamping bolt $o^3$ so that upon oscillating the trip arm both of the rock shafts and pawls attached thereto will be moved together.

P represents a supporting plate secured to the top of the rake head underneath the trip arm O by a bolt $p$. This plate is provided with two hook-shaped bearings $p'$ which support the rock shafts N on opposite sides of the trip arm. One of these bearings opens forwardly while the other bearing opens rearwardly. These bearings are secured to the rock shafts by placing the open ends of the bearings on diagonally opposite sides and in line with the rock shafts and then turning the supporting plate, thereby engaging both of the hook bearings with the rock shafts. This forms an extremely simple and convenient way of supporting the inner end of the rock shafts.

$p^2$ is the usual trip lever provided with a foot rest $p^3$ whereby the pawls are thrown into engagement with the ratchet wheels. This trip lever is pivoted to the rear cross bar of the draft frame and connected with the lower end of the trip arm by a bar $p^4$. Upon depressing the trip lever, the trip arm O and pawls are moved downwardly and engage with the ratchet wheels, whereby the rake head is caused to revolve with the driving wheels and elevate the rake teeth and rider bar for dumping the load. The pawls are normally held out of engagement with the ratchet wheels by a spring $p^5$ secured to the trip arm and bearing against the supporting plate P. The front end of each pawl is provided with a nose $m^9$ which strikes a stop $m^{10}$ on the clearer head when the load has been dumped, thereby disengaging the pawls from the ratchet wheels and permitting the ratchet teeth and connecting parts to return to their operative position. The stops $m^{10}$ are adjustably secured to the ends of the clearer head by bolts $m^{11}$ passing through slots $m^{12}$ formed in the stops.

Q represents a retaining lever whereby the rake teeth are held in a depressed or raised position by the pressure of the foot. This lever is arranged lengthwise over the rear cross bar of the draft frame and consists of a front arm or treadle $q$ and a rear arm $q'$. The retaining lever Q is provided between its arms with transverse trunnions $q^2$ which are journaled in eyes $q^3$ secured to the front cross bar $a'$ of the draft frame. The rear arm of the retaining lever is provided with a vertical longitudinal slot $q^4$.

R represents the rake arm attached with its lower end to the front side of the rake head and having its upper end bifurcated and curved forwardly.

$r$ represents a connecting bar which is arranged with its rear end in the bifurcated upper end of the rake arm and pivotally secured thereto by a bolt $r'$ passing through one of a series of openings $r^2$ in the rake arm. The front end of the connecting bar is arranged in the slot of the rear arm of the retaining lever and is pivotally secured thereto by a transverse bolt $r^3$. When the teeth are depressed and the foot rests upon the retaining lever Q, the pivot of the latter and the pivotal connection of the bar $r$ with the retaining lever and rake arm are in line or nearly so, as represented in Fig. 5, which necessitates only a slight pressure upon the treadle to hold the rake teeth down. The downward movement of the treadle of the retaining lever Q is limited by a stop $r^4$ formed on the rear end of its rear arm and adapted to engage against the under side of the connecting bar between the pivots of the latter.

$q^5$ represents a flat spring secured between its ends to the retaining lever and having a front portion $q^6$ and a rear portion $q^7$. Upon depressing the treadle of the retaining lever to hold the rake teeth down, the front end of the spring $q^5$ is pressed down upon the front cross bar of the draft frame. Upon removing the foot from the retaining lever, the treadle of the latter is raised by the spring $q^5$ which throws the pivotal connection between the retaining lever and the connecting bar $r$ downwardly and permits the rake teeth to be freely raised by the dumping mechanism. When the rake teeth are raised, the rake arm, connecting bar $r$ and retaining lever are shifted into the position shown in Fig. 6. After the rake teeth have discharged the load of hay they drop down again into their working position and the retaining lever and connecting bar $r$ are returned to their normal positions. When the rake teeth drop, the stop on the rear arm of the retaining lever is prevented from striking heavily against the under side of the connecting bar by the front portion of the spring $q^5$ bearing against the front cross bar thereby cushioning the return movement of the retaining lever.

$s$ represents a locking loop whereby the rake teeth are locked in a raised position in going to and from the field. This loop surrounds the central portion of the rear arm of the retaining lever and the latter is provided with two sockets $s'$ on opposite sides which receive the trunnions $s^2$ formed on the inner sides of the loop, as shown in Fig. 7. The connecting bar $r$ is provided with an extension $r^5$ in front of its front pivot. Upon swinging the upper portion of the loop rearwardly, the lower portion thereof clears the extension of the connecting bar which permits the latter and the retaining lever to swing freely upon each other in raising and lowering the rake teeth. When it is desired to hold the rake teeth in a raised position, the upper end of the loop is swung forward when the rear arm of the retaining lever is depressed which causes the lower portion of the loop to swing under the extension of the connecting bar and lock the same upon the retaining lever, thereby preventing the rake arm from rising. The rear end of the spring $q^5$ presses constantly upon the upper portion of the loop $s$ and holds the same in its locked or unlocked position. The upper portion of the loop is preferably provided with a toe piece $s^3$ whereby the loop is readily swung on its pivot by the foot.

In order to reduce the jarring of the machine when the rake teeth drop in returning to their normal position, the rake head arm is yieldingly connected with the rake head as follows:—The rake arm is provided on opposite sides with transverse trunnions $r^6$ which are journaled in sockets $t$ formed in a supporting plate T secured to the front side of the rake head. The trunnions $r^6$ are prevented from wearing against the adjacent portion of the rake head by a wearing plate $t'$ interposed between the trunnions and the rake head. $u$ represents a spring which yieldingly holds the rake arm and rake head against movement with reference to each other. This spring is preferably composed of a C-shaped piece of flat steel and secured with one end to the under side of the rake head by a bolt $u'$ while its opposite end bears against the front side of the rake arm. During the return movement of the rake arm and teeth after dumping the hay, the rake arm and teeth move together until the movement of the rake arm is arrested by the connecting bar. The rake head and teeth by their momentum continue their swinging movement independent of the rake arm, which causes the spring $u$ to be strained thereby cushioning the fall of the rake teeth and bringing them into their working position without any perceptible jarring of the machine. The spring $u$ also permits the rake head to yield when backing or in turning the machine. The return movement of the rake teeth is limited by a shoulder $u^2$ formed on the lower portion of the rake arm and engaging with a stop $u^3$ formed on the supporting plate T. When the rake teeth are raised for dumping the hay, the rake arm descends and strikes against a wearing block $u^4$ secured to the front side of the clearer head. This wearing block is provided with a convex wearing face so that the curved side of the rake arm will engage against the same with a wedge or cam action instead of striking the same squarely, thereby preventing jarring of the machine. During the subsequent falling of the clearer sticks after the hay has been discharged, the weight of the sticks causes the wearing block to press forwardly against the rake arm thereby moving the rake teeth from the dead center and assisting them during the first portion of their downward movement. When the rake head and teeth are raised for transportation or storage of the machine, the rake arm strikes against the wearing block of the clearer head and raises the clearer sticks, thereby causing the rake teeth and clearer sticks to be raised at one operation.

I claim as my invention—

1. The combination with the rake head provided in its upper rear corner with a longitudinal recess or rabbet, and a longitudinal groove extending into said rake head from one side of said recess or rabbet, of rake teeth provided with wrists seated in said groove, and a cleat provided on its under side with vertical slots and secured in said recess whereby the wrists of the teeth are confined in the groove in the rake head, substantially as set forth.

2. The combination with the rake head and the rider bar secured thereto and provided with vertical slots, of rake teeth pivoted to the rake head and passing through the slots of the rider bar and coils formed on the rake teeth between the rake head and rider bar, substantially as set forth.

3. The combination with the draft frame, the rake head and the clearer head, of a hinge bracket secured to the draft frame, and provided with pins projecting in opposite directions, an eye secured to the rake head and engaging with one of said pins and an eye secured to the clearer head and engaging with the other pin, substantially as set forth.

4. The combination with the draft frame and the clearer head, of a bracket secured to the draft frame and provided with a pin, an eye secured to the clearer bar and engaging with said pin, and a plate adjustably secured to the clearer head and adapted to bear against the bracket, substantially as set forth.

5. The combination with the rake head and the driving wheel provided with a ratchet wheel, of a rock shaft journaled upon the rake head and provided at its outer end with an arm bent at right angles to the shaft, and a pawl adapted to engage with the ratchet wheel and provided with an eye through which the rock shaft passes, and a groove which receives the bent arm of said shaft, substantially as set forth.

6. The combination with the rake head and the driving wheel provided with a ratchet wheel, of a rock shaft journaled upon the rake head and provided at its outer end with an arm bent at right angles to the shaft, the end of said arm being bent inwardly, and a pawl adapted to engage with said ratchet wheel, and provided with an eye through which the rock shaft passes, and with an opening which receives the bent arm of said rock shaft whereby the pawl is attached to said rock shaft, substantially as set forth.

7. The combination with the rake head and the driving wheel provided with a ratchet wheel, of a bearing secured to the rake head, a pawl pivoted in said bearing and adapted to engage with the ratchet wheel, an opening or eye passing through the pivot of said pawl, a groove extending radially from said eye, and a rock shaft journaled on the rake head with its outer end passing through the pivot of the pawl and provided outside of said pivot with a laterally bent arm which is arranged in the groove of the pawl, substantially as set forth.

8. The combination with the rake head and the driving wheels provided with ratchet wheels, of separate rock shafts journaled on the rake head and provided at their outer ends with pawls adapted to engage with the ratchet wheels, a trip arm connecting the inner ends of the rock shafts, a supporting plate secured to the rake head underneath the trip arm and provided with open bearings supporting the inner ends of the rock shafts, a spring secured to the trip arm, and bearing against the supporting plate, and a trip lever pivoted to the frame and connected with the trip arm, substantially as set forth.

9. The combination with the rake head and the driving wheels provided with ratchet wheels, of rock shafts provided at their inner ends with laterally bent arms and at their outer ends with arms bent at right angles with the shafts, pawls engaging with the ratchet wheels and journaled in bearings secured to the rake head, each of said pawls being provided with a hollow journal through which the adjacent rock shaft passes and with a groove which receives the outer bent arm of said shaft, a trip arm connecting the inner bent arms of the rock shafts, a supporting plate secured to the rake head and provided with bearings opening in opposite directions and forming journals for the rock shafts, on opposite sides of the trip arms, and a trip lever connected with the trip arm, substantially as set forth.

10. The combination with the draft frame and the rake head provided with a rake arm, of a retaining lever pivoted upon the draft frame and having a front arm or treadle and a rear arm, a bar connecting the latter with the rake arm, and a spring secured to the retaining lever and adapted to bear against the draft frame, substantially as set forth.

11. The combination with the draft frame and the rake head provided with a rake arm, of a retaining lever pivoted upon the draft frame and provided with a front and rear arm, a bar connecting the rear arm with the rake arm, and a locking loop pivoted upon said rear arm and adapted to lock the retaining lever and connecting bar together, substantially as set forth.

12. The combination with the draft frame and the rake head provided with a rake arm, of a retaining lever pivoted upon the draft frame and provided with a front arm and a rear arm having a longitudinal slot, a connecting bar pivoted at its rear end to the rake arm and pivotally secured with its front end in the slotted rear arm of the retaining lever, a swinging loop surrounding said rear arm and adapted to engage its lower end with the connecting bar, and a spring bearing against the upper end of said loop, substantially as set forth.

13. The combination with the draft frame, the retaining lever pivoted upon the draft frame and the rake head, of a rake arm pivoted to the rake head, a bar connecting the retaining lever with the rake arm and a spring whereby the rake arm is yieldingly connected with the rake head, substantially as set forth.

14. The combination with the draft frame, the retaining lever pivoted upon the draft frame and the rake head, of a supporting plate secured to the rake head and provided with sockets, a rake arm provided with trunnions journaled in said sockets and a spring secured with one end to the rake head and bearing with its opposite end against the rake arm, substantially as set forth.

15. The combination with the draft frame, the retaining lever pivoted to the draft frame and the rake head, of a supporting plate secured to the rake head and provided with a stop, a rake arm pivoted to said supporting plate and provided with a shoulder adapted to engage with said stop, and a spring secured with one end to the rake head and bearing with its opposite end against the rake arm, substantially as set forth.

16. The combination with the pivoted rake head provided with rake teeth and the oscillating clearer head provided with clearer sticks, of a rake arm secured to the rake head and adapted to engage against the clearer head, substantially as set forth.

17. The combination with the pivoted rake head provided with ratchet teeth and the oscillating clearer head provided with clearer sticks, of a wearing block secured to the clearer head and provided with a convex face and a rake arm secured to the rake head and provided with a curved portion adapted to engage with the convex face of the wearing block, substantially as set forth.

Witness my hand this 22d day of August, 1892.

MARQUIS J. TODD.

Witnesses:
CARL F. GEYER,
THEO. L. POPP.